United States Patent [19]
Kijima et al.

[11] Patent Number: 4,536,007
[45] Date of Patent: Aug. 20, 1985

[54] VEHICLE REAR SUSPENSION MECHANISM

[75] Inventors: Takao Kijima; Jiro Maebayashi; Fumitaka Ando, all of Hiroshima, Japan

[73] Assignee: Mazda Motor Corporation, Hiroshima, Japan

[21] Appl. No.: 489,132

[22] Filed: Apr. 27, 1983

[30] Foreign Application Priority Data

Apr. 28, 1982 [JP] Japan ............................... 57-71938
Apr. 28, 1982 [JP] Japan ............................... 57-71939
Apr. 29, 1982 [JP] Japan ............................... 57-72159

[51] Int. Cl.³ .......................... B60G 3/26; B60G 7/00
[52] U.S. Cl. .................................. 280/701; 180/73.3; 267/20 R; 280/689; 280/690
[58] Field of Search ...................... 280/701, 660–671, 280/673–675, 688, 690, 689; 267/20 R, 57 R; 180/73 R

[56] References Cited

U.S. PATENT DOCUMENTS

| | | | |
|---|---|---|---|
| 2,998,265 | 8/1961 | Kozicki | 267/20 R X |
| 4,143,887 | 3/1979 | Williams et al. | 267/57 R X |
| 4,415,178 | 11/1983 | Hatsushi et al. | 267/57 R X |
| 4,421,332 | 12/1983 | Kosak et al. | 280/701 X |
| 4,436,175 | 3/1984 | Watanabe et al. | 280/688 X |
| 4,440,419 | 4/1984 | Kosak et al. | 280/701 X |

FOREIGN PATENT DOCUMENTS

| | | |
|---|---|---|
| 2158931 | 11/1971 | Fed. Rep. of Germany . |
| 2355954 | 8/1973 | Fed. Rep. of Germany . |
| 52-37649 | 9/1977 | Japan . |
| 1345859 | 11/1972 | United Kingdom . |

*Primary Examiner*—Joseph F. Peters, Jr.
*Assistant Examiner*—Mitchell J. Hill
*Attorney, Agent, or Firm*—Fleit, Jacobson, Cohn & Price

[57] ABSTRACT

A vehicle rear suspension mechanism capable of producing a toe-in displacement under a side force, a brake force, an engine brake force and an engine drive force to obtain a stabilized stearing property. The mechanism includes a suspension member connected with a vehicle body, a wheel hub supporting a rear wheel for rotation about a rotating axis, a connecting device for connecting the wheel hub with the suspension member. The connecting device includes a ball joint connecting the wheel hub to the suspension member pivotably about the joint center, a first resilient bush located between the wheel hub and the suspension member, and a second resilient bush located between the wheel hub and the suspension member. The ball joint is located rearwardly of and below the wheel center, whereas the first resilient member is rearwardly of and above the wheel center and the second resilient member forwardly of and above the wheel center.

10 Claims, 14 Drawing Figures

VEHICLE REAR SUSPENSION MECHANISM

CROSS-REFERENCE TO RELATED APPLICATIONS

The following are closely related copending U.S. patent applications:

| U.S. Serial No. | Filing date |
| --- | --- |
| 489,106 | April 27, 1983 |
| 489,492 | April 28, 1983 |
| 489,551 | April 28, 1983 |
| 498,433 | May 26, 1983 |
| 510,813 | July 5, 1983 |
| 513,028 | July 12, 1983 |

The present invention relates to vehicle suspension mechanisms and more particularly to vehicle rear suspension mechanisms. More specifically, the present invention pertains to a vehicle rear suspension mechanism in which a toe-in displacement is produced in an outboard rear wheel under a transversely inwardly directed side force.

In general, vehicle rear wheels are subjected, when the vehicle is running through a curved path, to a side force which is directed toward the center of curvature. In order to obtain a steering stability in an operation through a curved path, various propals have been made to make use of such side force to produce a toe-in displacement in a rear wheel, particularly, in an outboard rear wheel located otherwise from the other wheel with respect to the center of curvature, so that an over steering can effectively be prevented. For example, German patent specification No. 2,158,931 discloses a vehicle rear suspension including a rear suspension arm having one end mounted on a vehicle body member for vertical swinging movements and the other end connected with a wheel hub which in turn carries a rear wheel for rotation about its own axis. The connection between the suspension arm and the wheel-hub is such that the wheel hub is connected to the arm by means of a vertically extending pivot pin which is located rearwards of the axis of the wheel and a spring is disposed forwardly of the wheel axis between the wheel hub and the suspension arm. Thus, when the wheel is subjected to an inwardly directed side force, the spring is deflected and a toe-in displacement is produced in the wheel about the joint pin. The German Pat. No. 2,355,954 proposes in this type of rear suspension mechanism to vary the spring force in accordance with the side force.

In Japanese patent publication No. 52-37649 corresponding to German patent application No. P 2200351.6 discloses a vehicle rear suspension including a rear suspension arm having one end swingable connected with a vehicle body member and the other end connected with a rear wheel hub. Between the suspension arm and the wheel hub, there are provided a pair of longitudinally spaced resilient members which are deflect in the transverse direction. The forward resilient member has a coefficient of resiliency which is smaller than that of the rearward resilient member so that a larger deflection is produced under a side force in the forward resilient member than in the rearward resilient member producing a toe-in displacement in the rear wheel. Further, there is described in the Japanese patent publication that a toe-in displacement of the rear wheel is also produced under a braking force by placing the center of displacement transversely outwardly of the central plane of the rear wheel.

It should however be noted tha the aforementioned structures rely only to sideward deformations of springs or of resilient members for producing the toe-in displacements so that the side force cannot effectively be utilized. Further, the structures are not designed to produce a toe-in displacement under a force transmitted through a drive axle such as a driving torque or an engine brake force. Moreover, the German patents do not deal with the subject matter of producing a toe-in displacement under a wheel braking force.

It is therefore an object of the present invention to provide a vehicle rear suspension mechanism in which a toe-in displacement can be produced in the rear wheel effectively under a side force acting on the wheel.

Another object of the present invention is to provide a vehicle rear suspension mechanism in which a rear wheel toe-in displacement can be produced not only under a side force but also under other forces applied to the rear wheel.

A further object of the present invention is to provide a vehicle rear suspension mechanism which can utilize the side force efficiently for producing a toe-in displacement in the rear wheel.

According to the present invention, the above and other objects can be accomplished by a vehicle rear suspension mechanism comprising a suspension member connected with a vehicle body, wheel hub means supporting a rear wheel having a wheel center plane for rotation about a rotating axis, connecting means for connecting said wheel hub means with said suspension member, said connecting means including ball joint means having a pivot center located rearwardly of and below the rotating axis of the rear wheel and connecting said wheel hub to said suspension member pivotably about the pivot center, first resilient means located between said wheel hub means and said suspension member rearwardly of and above the rotating axis of the rear wheel, second resilient means located between said wheel hub means and said suspension member forwardly of and above the rotating axis of the rear wheel. According to the features of the present invention, any displacement of the wheel hub means is made about the ball joint means located rearwardly of the rotating axis of the rear wheel so that a toe-in movement of the rear wheel can positively be produced with a minimum wheel displacement under a side force. Further, through the simple arrangement of the ball joint means and the two resilient means, it becomes possible to produce a toe-in movement in the rear wheel under various forces including a side force and other forces. Since the first and second resilient means are located above the wheel rotating axis whereas the ball joint means is below the wheel rotating axis, it is possible to decrease the forces produced in the resilient means under a side force as compared with an arrangement wherein the ball joint means is above and the resilient means are below the rotating axis. It should further be noted that the ball joint means is located near the ground level, so that the toe-in displacement can be produced with a small slip between the rear wheel and the ground surface. The suspension member may be any type of member which is mounted on the vehicle body in one hand and connected with the wheel hub means on the other hand.

In order to produce a toe-in displacement under a braking force, the ball joint means and the first and second resilient means should be located so that a plane passing through the pivot center and centers of said first and second resilient means intersects a horizontal plane on ground level transversely outwardly of the wheel center plane. The wheel center plane may be defined as a vertical plane in the rear wheel passing through a wheel center and perpendicular to the rotating axis of the rear wheel. Preferably, the plane passing through the pivot center and the centers of said first and second resilient means intersects a horizontal plane passing through the wheel center transversely inwardly of the center plane, in the vertical plane passing through the rotating axis of the rear wheel. With this arrangement, it becomes possible to produce a toe-in displacement of the rear wheel under the engine brake force and the driving force.

The first and second resilient means may be in the form of rubber bushes having longitudinal axes and the ball joint means may be located at a rear lower portion with respect to the wheel rotating axis. The axis of the rubber bushes may be arranged so that a toe-in displacement is produced in the rear wheel when the wheel hub means is swung rearwardly or forwardly about the pivot point. This arrangement makes it possible to produce a toe-in movement under all of the side force, the braking force, the engine brake force and the wheel drive force. If necessary stop means may be provided in the rubber bushes.

The above and other objects and features will become apparent from the following descriptions of preferred embodiments taking reference to the accompanying drawings, in which:

FIG. 1b is vertical sectional view showing the connection between the suspension arm and the wheel hub in the right side rear suspension mechanism corresponding to the mechanism shown in FIG. 1a;

Figure 1A:
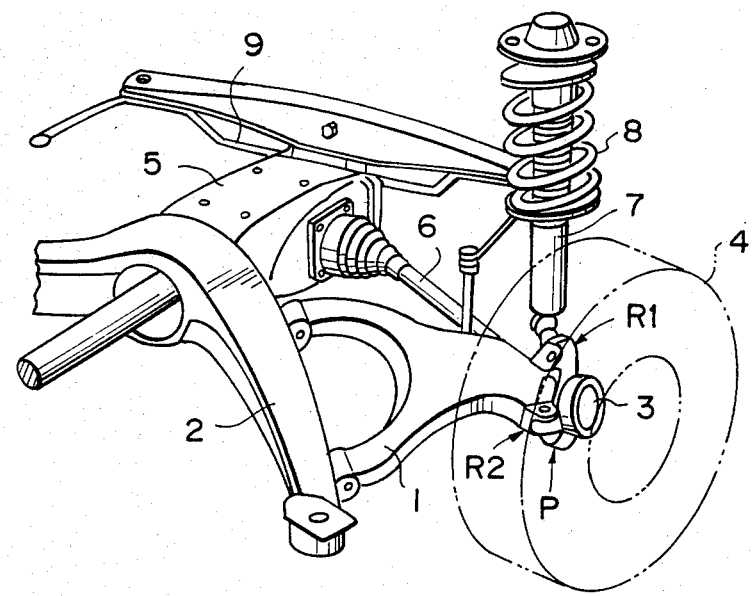
FIG. 1a is a fragmentary perspective view of a left side rear suspension mechanism in accordance with one embodiment of the present invention.

Referring now to the drawings, particularly to FIG. 1a there is shown a vehicle rear suspension mechanism of a semi-trailing arm type including a suspension arm 1 having a bifurcated front end portion connected for vertical swinging movement with a transversely extending sub-frame member 2 of a vehicle body which carries a differential gear box 5. The rear end portion of the suspension arm 1 carries a wheel hub 3 which in turn carries a rear wheel 4 for rotation about a rotating axis. The rear wheel 4 is connected with a drive axle 6 which extends from the differential gear box 5 so as to be driven by an engine. Between the rear end portion of the suspension arm 1 and the vehicle body, there is provided a shock absorber 7 and a spring 8. A stabilizer 9 may be provided as well known in the art.

Figure 1B:
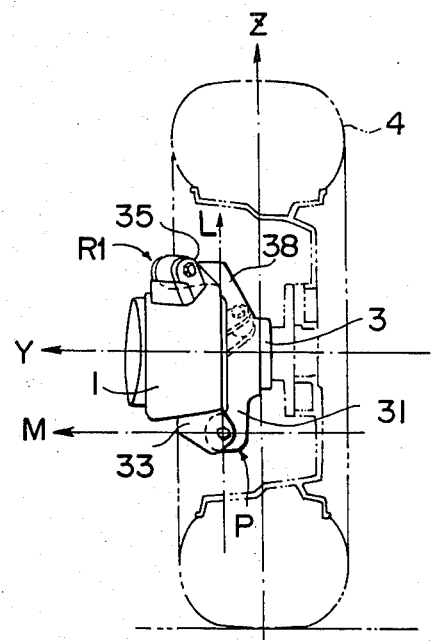
Figure 1C:
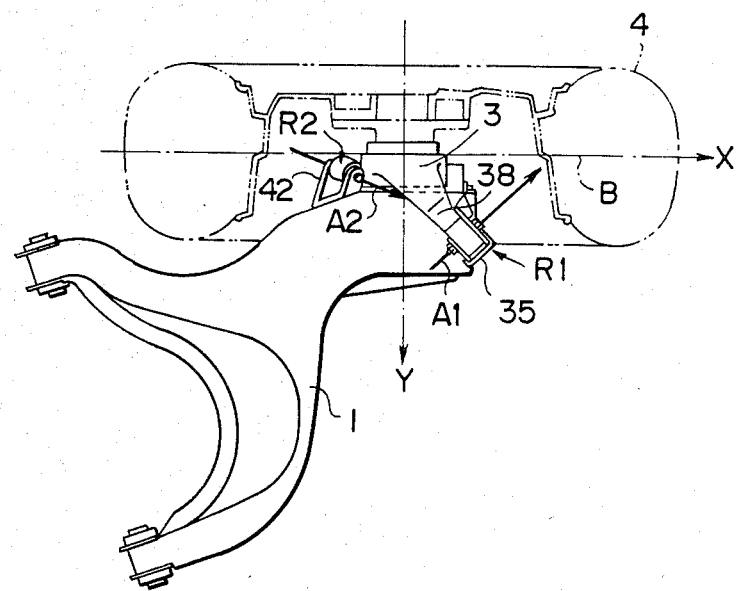
FIG. 1c is a plan view of the mechanism shown in FIG. 1b.
Figure 1D:
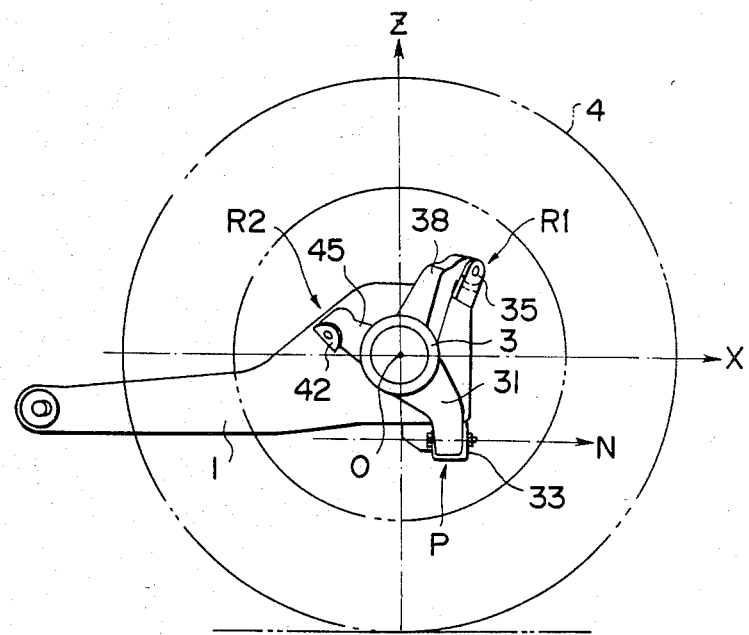
FIG. 1d is a side view as seen from the transverse inside.
Figure 1E:
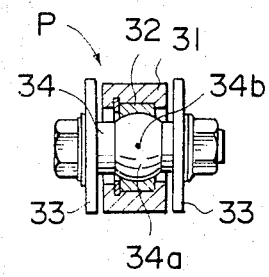
FIG. 1e is a sectional view showing a ball joint used in the mechanism shown in FIGS. 1a through 1d.

As shown in FIGS. 1b, 1c and 1d, the wheel hub 3 is connected with the suspension arm 1 through a ball joint P and a pair of rubber bushes $R_1$ and $R_2$. Referring to FIG. 1d, it will be noted that the wheel hub 3 has a radially extending arm 31 which carries at the outer end a bearing metal block 32 having a part spherical recess as shown in FIG. 1e. The rear end portion of the suspension arm 1 is formed with a pair of lugs 33 which are located at the opposite sides of the outer end portion of the arm 31. A pin 34 having a part spherical portion 34a is inserted through the lugs 33 and the outer end portion of the radial arm 31 on the wheel hub 3 with the part spherical portion 34a seated in the part spherical recess in the bearing metal block 32 to constitute the ball joint P. Thus, the wheel hub 3 is swingable with respect to the suspension arm 1 about the center 34b of the part spherical portion 34a.

Figure 1F:
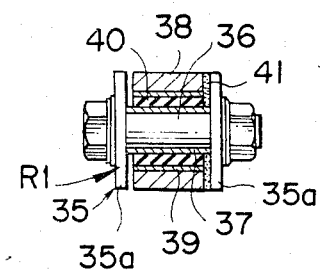
FIG. 1f is a sectional view showing the rear rubber bush.
Figure 1G:
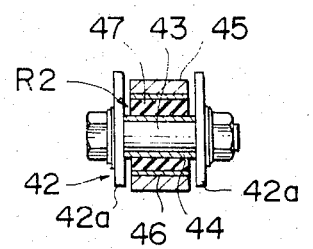
FIG. 1g is a sectional view showing the front rubber bush.
Figure 1H:
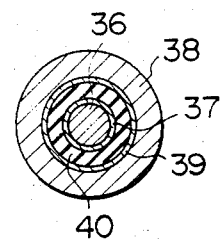
FIG. 1h is a cross-sectional view of the rubber bush shown in FIG. 1f.

Referring to FIGS. 1f and 1h which show the rubber bush $R_1$ as well as the FIG. 1d, the wheel hub 3 has a radially extending arm 38 carrying the rubber bush $R_1$ which includes an inner tube 37, an outer tube 39 of a length shorter than the inner tube 37 and a resilient rubber 40 disposed between the inner and outer tubes 37 and 39. The suspension arm 1 is formed with a bracket 35 having a pair of lugs 35a. The outer tube 39 is secured to the arm 38 which is located between the lugs 36a and the inner tube 37 is held between the lugs 35a by means of a bolt 36. Between one axial end of the rubber bush $R_1$ and one of the lugs 35a, there is provided a stopper 41 of a relatively hard rubber so that the arm 38 is displaceable only in one axial direction.

Figure 1I:
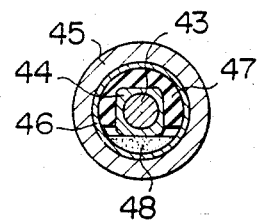
FIG. 1i is a cross-sectional view of the rubber bush shown in FIG. 1g.

Referring to FIGS. 1g and 1i, it will be noted that the rubber bush $R_2$ is similar in structure and includes inner tube 44, an outer tube 46 and a resilient rubber 47. The outer tube 46 is secured to a radially extending arm 45 formed in the wheel hub 3 and the inner tube 44 is attached by means of a bolt 43 to a pair of lugs 42a formed in a bracket 42 provided on the suspension arm 1. In this example, the bush $R_2$ is provided with a stopper 48 of a hand rubber which functions to restrict a radial displacement in one direction of the arm 45.

In the illustrated embodiment, the ball joint P is located rear and downwardly of the rotating axis O of the wheel 4. In other words, as seen from left side, it is located in the fourth quadrant of a rectangular coordinate defined by an abscissa X and an ordinate Z having an origine at the rotating axis O as shown in FIG. 1d. The rubber bush $R_1$ is in a rear and upward position with respect to the wheel rotating axis O, or in other words, in the first quadrant in the coordinate mentioned above. Further, the rubber bush $R_1$ is arranged with the stopper 41 located at the front side so that the forward displacement of the arm 38 and therefore the forward rotation of the wheel hub 3 are restricted. The rubber bush $R_2$ is located in a forward and upward portion with respect to the wheel rotating axis O, that is, in the second quadrant in the aforementioned coordinate.

As shown in FIG. 1c, the rubber bush $R_1$ is arranged in a plan view with its longitudinal axis $A_1$ inclined rearwardly and outwardly with respect to a center plane B of the rear wheel 4 and, as described previously, the arm 38 on the wheel hub 3 is displaceable in the direction shown by an arrow but is restricted to be displaced in the opposite direction due to the existence of the stopper 41. The rubber bush $R_2$ is arranged with its longitudinal axis $A_2$ inclined rearwardly and inwardly with respect to the center plane B of the rear wheel 4 and the arm 45 is displaceable along the axis $A_2$. Further, the rubber bush $R_2$ is arranged with the stopper 48 located transversely outside so that an outward displacement of the arm 45 is restricted. The above arrangements are diagrammatically shown in FIG. 4.

Figure 4:
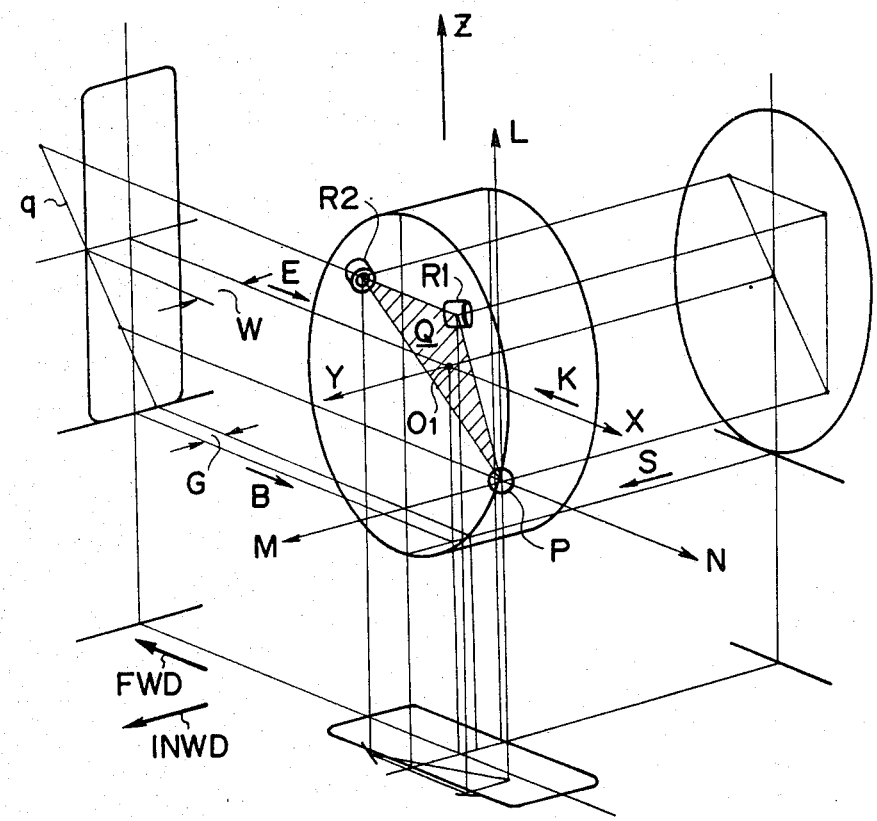
FIG. 4 is a diagrammatical illustration showing geometrical arrangements of the ball joint and the rubber bushes.

In FIG. 4, it will further be noted that a plane Q is defined by the center 34b of the ball joint P and centers of the rubber bushes $R_1$ and $R_2$, the centers of the rubber bushes being defines as the longitudinal centers on the longitudinal axes of the bushes. There is further defined a rectangular coordinate comprised of a longitudinal horizontal axis X, a vertical axis Z and a transverse horizontal axis Y intersecting with each other at the center $O_1$ of the rear wheel 4 which is defined at the intersection between the rotating axis and the center plane. In the illustrated arrangement, the plane Q intersects the YZ plane defining an imaginary line q which is transversely offset inwardly from the wheel center plane by a distance W at the level of the wheel center $O_1$ and outwardly from the wheel center plane by a distance G at the ground level.

With this arrangement, the following displacements are produced in the rear wheel 4. For the purpose of explanation, definition is made of a second rectangular coordinate including a vertical axis L, a transverse horizontal axis M and a longitudinal horizontal axis N having an origin at the center of the ball joint P.

(a) Behaviur under a Side Force S

A side force S is applied when the vehicle is running through a curved path to an outboard rear wheel in the inward direction at the ground level. This side force S produces about the longitudinal axis N a moment which tends to incline the wheel outwardly and, since the ball joint P is rearwardly offset from the wheel center $O_1$, a further moment is produced about the vertical axis L to make the rubber bush $R_2$ deflect transversely inwardly. Thus, a toe-in displacement is produced in the rear wheel. The rubber bush $R_1$ is appropriately deflected in this instance depending on the location thereof.

(b) Behavior under a Braking Force B

The braking force B is applied rearwardly to the rear wheel 4 at the ground level. Since the plane Q is offset at the ground level transversely outwardly by the distance G, the rear wheel 4 is swung about the axis L under the braking force B so that the front portion of the wheel 4 is moved laterally inwardly. Thus, a toe-in displacement is produced in the rear wheel 4. At this instance, there is also produced about the transverse axis M a moment which tends the plane Q to rotate forwardly about the ball joint P. Due to the inclination of the axes $A_1$ and $A_2$ of the rubber bushes $R_1$ and $R_2$, the moment tends to deflect the rubber bush $R_1$ laterally inwardly and the rubber bush $R_2$ laterally outwardly possibly causing a toe-out movement. However, since the rubber bush $R_1$ has the aforementioned stopper 41, such lateral inward deflection is prevented and the toe-out trend can be overcome by the aforementioned toe-in trend.

(c) Behavior under an Engine Brake Force E

The engine brake force is applied rearwardly at the wheel center $O_1$ producing a rearward moment about the ball joint P. Since the longitudinal axes $A_1$ and $A_2$ of the rubber bushes $R_1$ and $R_2$ are inclined with respect to the wheel center plane B as previously described, the rubber bush $R_1$ is deformed outwardly under this moment as shown by the arrow in FIG. 1c, whereas the rubber bush $R_2$ is deformed inwardly. Thus, a toe-in movement is produced in the rear wheel 4.

(d) Behavior under a Driving Force K

The driving force K is applied forwardly to the rear wheel 4 at the wheel center $O_1$. Since the plane Q is offset inwardly from the wheel center plane at the level of the wheel center $O_1$, the force K produces a movement about the vertical axis L which tends to rotate the plane Q so that the forward portion thereof is moved inwardly. Thus, a toe-in movement is produced. In this instance, a trend of producing a toe-out movement may occur due to the inclinations of the longitudinal axes of the rubber bushes $R_1$ and $R_2$, however, since the rubber bush $R_1$ has the stopper 41, the trend is suppressed and overcome by the aforementioned trend of producing a toe-in movement.

Figure 5:
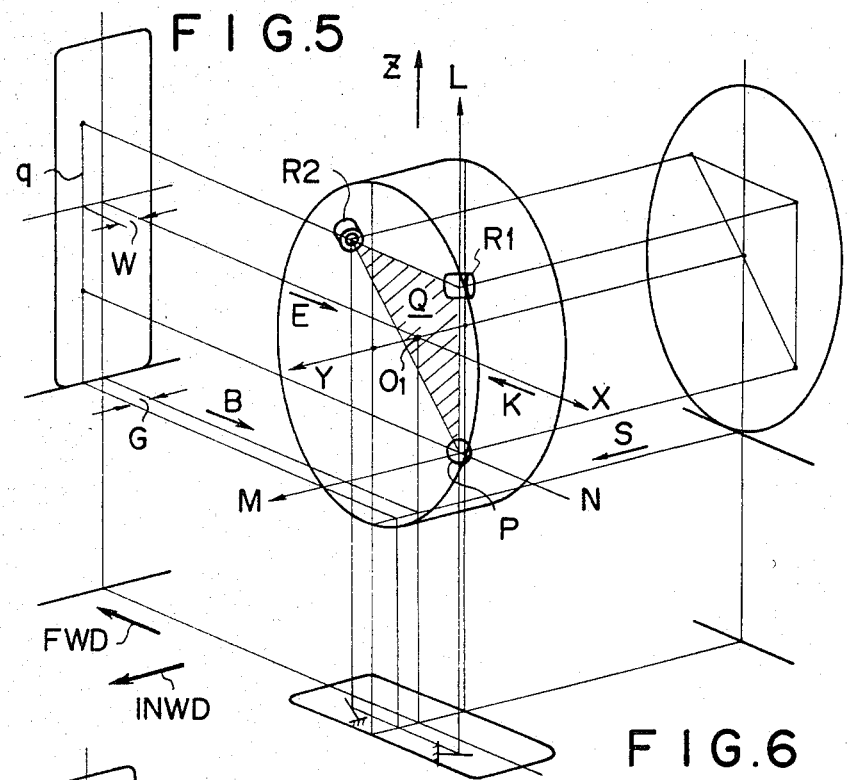
FIGS. 5 and 6 are diagrammatical illustrations similar to FIG. 4 but showing other examples.

In an alternative arrangement shown in FIG. 5, the plane Q is located so that the imaginary intersection line q is offset transversely inwardly both at the level of the wheel center and at the ground level. In this arrangement, a toe-in movement can be produced under either of the side force S, the engine brake force E and the engine driving force K in a similar way as described in either of the above sub-paragraphs (a), (c) and (d). However, under a braking force B, the plane Q will be rotated outwardly about the ball joint P producing a toe-out movement in the wheel 4. Nevertheless, this arrangement is very often satisfactory depending on the type of the vehicles.

Figure 6:
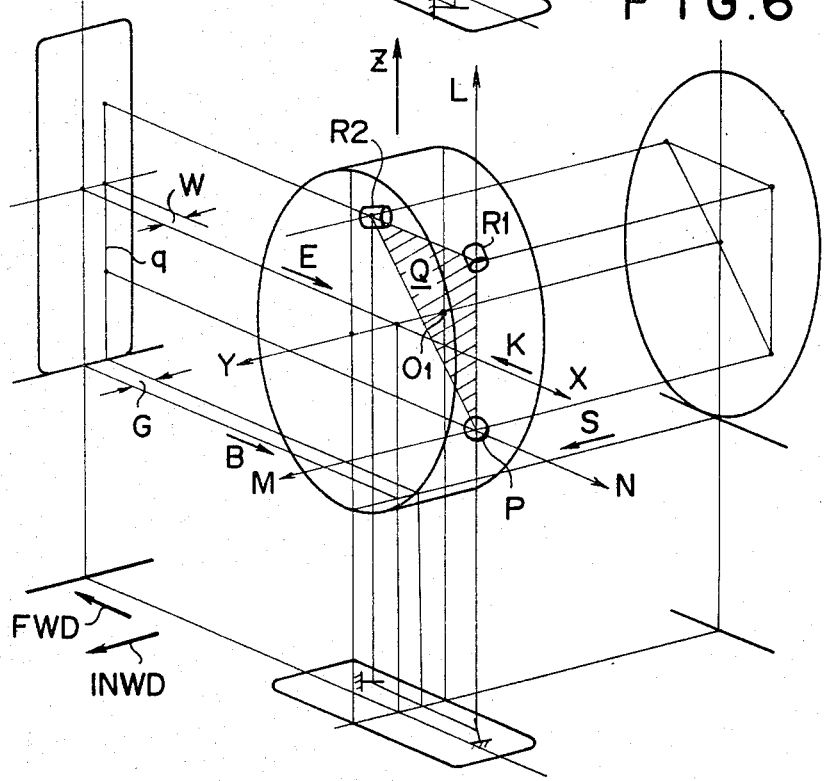

In a further alternative arrangement shown in FIG. 6, the plane Q is located so that the imaginary intersection line q is offset outwardly both at the level of the wheel center and the ground level. In this arrangement, the rubber bushes $R_1$ and $R_2$ are arranged so that the longitudinal axes of the bushes $R_1$ and $R_2$ are inclined in the ways opposite to those shown in FIGS. 1c and 4. In this instance, the stopper 41 of the rubber bush $R_1$ is located at the rear end so that a rearward deflection of the bush is restricted. With this arrangement, it is possible to produce a toe-in movement under a side force S as in sub-paragraph (a). Under braking force B, the plane Q is rotated about the axes M and L producing a toe-in movement. Under the engine brake force E, the plane Q is rotated about the axis L to produce a toe-in movement. At this instance, there may be produced a trend of toe-out movement, however, the trend is suppressed by the stopper 41 provided at the rear end of the bush $R_1$. Alternatively or in addition, the rubber bush $R_2$ may have a stopper at the front end. Under the engine drive force K, the plane Q is rotated about the axis M and produces a toe-in movement.

Figure 2:
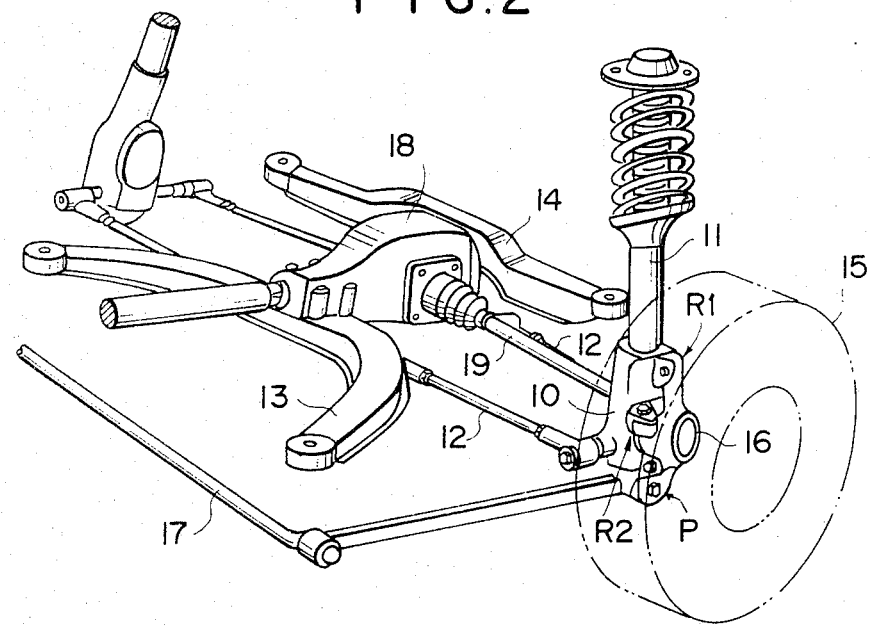
FIG. 2 is a fragmentary perspective view of a rear suspension mechanism similar to FIG. 1a but showing another example.

Referring to FIG. 2, there is shown another example of a vehicle rear suspension which includes a strut hub 10 to which a suspension strut assembly 11 is secured at its lower end. The strut hub 10 is connected through a pair of transverse links 12 with sub-frames 13 and 14 of a vehicle body which also carry a differential gear box 18. A stabilizer 17 may be provided as well known in the art. A wheel hub 16 carries a rear wheel 15 for rotation about a rotating axis. In this type of suspension mechanism, the wheel hub 16 is connected with the strut hub 10 through a ball joint P and a pair of rubber bushes $R_1$ and $R_2$ which are arranged in anyone of the manners described previously. A drive axle 19 extends from the differential gear box 18 to drive the wheel 15.

Figure 3:
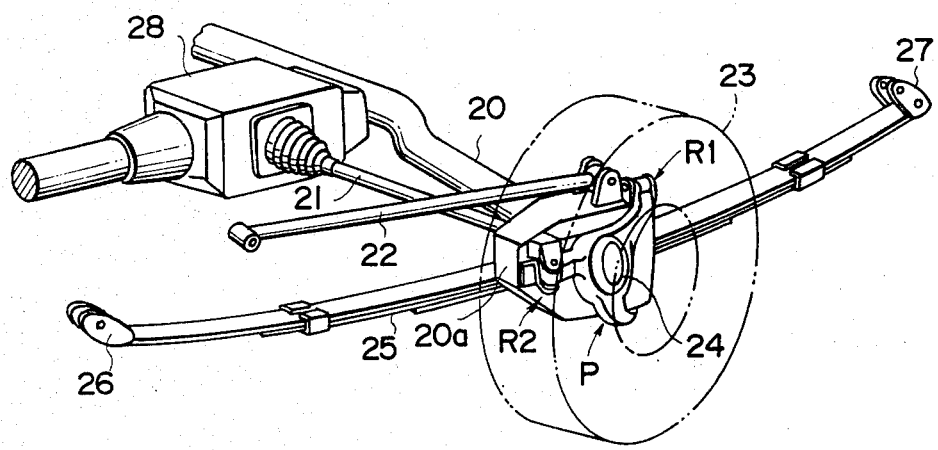
FIG. 3 is a fragmentary perspective view showing a further example.

FIG. 3 shows a further example of a vehicle rear suspension mechanism which includes a transversely extending pipe 20 having a wheel support bracket 20a at each end. The bracket 20a is suspended by a leaf spring assembly 25 which are attached to the vehicle body (not shown) through fittings 26 and 27. A differential gear box 28 is provided and has a drive axle 21 to drive a rear wheel 23. The bracket 20a is also connected through a tension rod 22 with the vehicle body. The rear wheel 23 is rotatably carried by a wheel hub 24 which is connected with the bracket 20a through a ball joint P and a pair of rubber bushes $R_1$ and $R_2$ arranged in any of the manners described previously.

The invention has thus been shown and described with reference to specific embodiments, however, it should be noted that the invention is in no way limited to the details of the illustrated arrangements but changes and modifications may be made without departing from the scope of the appended claims.

We claim:

1. A vehicle rear suspension mechanism comprising a suspension member connected with a vehicle body, wheel hub means supporting a rear wheel having a wheel center plane for rotation about a rotating axis, connecting means for connecting said wheel hub means with said suspension member, said connecting means including ball joint means having a pivot center located rearwardly of and below the rotating axis of the rear wheel and connecting said wheel hub to said suspension member pivotably about the pivot center, first resilient means located between said wheel hub means and said suspension member rearwardly of and above the rotating axis of the rear wheel, second resilient means located between said wheel hub means and said suspension member forwardly of and above the rotating axis of the rear wheel.

2. A vehicle rear suspension mechanism in accordance with claim 1 in which a plane containing the pivot center of the ball joint means and centers of said first and second resilient means has an intersection with a vertical plane containing said rotating axis to define an intersection line which is offset at ground level transversely outwardly of said wheel center plane.

3. A vehicle rear suspension mechanism in accordance with claim 2 in which said intersection line is offset transversely inwardly at the level of the rotating axis.

4. A vehicle rear suspension mechanism in accordance with claim 2 in which said intersection line is offset transversely outwardly at the level of the rotating axis.

5. A vehicle rear suspension mechanism in accordance with claim 3 in which said first and second resilient means have axes of deflection which are arranged so that they permit a rearward rotation of said hub means with respect to said suspension member and through such rearward rotation of the hub means a toe-in movement of said rear wheel is produced.

6. A vehicle rear suspension mechanism in accordance with claim 4 in which said first and second resilient means have axes of deflection which are arranged so that they permit a forward rotation of said hub means with respect to said suspension member and through such forward rotation of said hub means a toe-in movement of said rear wheel is produced.

7. A vehicle rear suspension mechanism in accordance with claim 3 in which said first resilient means is provided with stopper means for restricting a forward displacement so that it permit a rearward rotation of said hub means but restrict a forward rotation thereof with respect to said suspension member, whereby a toe-in movement of the rear wheel is produced through the rearward rotation of the hub means.

8. A vehicle rear suspension mechanism in accordance with claim 3 in which at least one of said first and second resilient means includes means for restricting at least one of transverse inward deformation of said first resilient means and transverse outward deformation of said second resilient means.

9. A vehicle rear suspension mechanism in accordance with claim 4 in which said first resilient means is provided with stopper means for restricting a rearward displacement so that it permit a forward rotation of said hub means but restrict a rearward rotation thereof with respect to said suspension member, whereby a toe-in movement of a rear wheel is produced through the forward rotation of the hub means.

10. A vehicle rear suspension mechanism in accordance with claim 4 in which at least one of said first and second resilient means includes means for restricting at least one of transverse inward deformation of said first resilient means and transverse outward deformation of said second resilient means.

* * * * *